United States Patent [19]

Bandlish et al.

[11] 4,335,006
[45] Jun. 15, 1982

[54] METHOD OF STABILIZING LUBRICATING FLUIDS

[75] Inventors: Baldev K. Bandlish, Middlebury; Frederick C. Loveless, Cheshire; Walter Nudenberg, Newtown, all of Conn.

[73] Assignee: Uniroyal, Inc., New York, N.Y.

[21] Appl. No.: 194,326

[22] Filed: Oct. 6, 1980

Related U.S. Application Data

[63] Continuation of Ser. No. 43,995, May 31, 1979, abandoned.

[51] Int. Cl.$^3$ .......................... C10M 1/10; C10M 1/54
[52] U.S. Cl. .................................. 252/49.7; 252/37.5; 252/56 S; 252/389 R; 252/400 R
[58] Field of Search .................... 252/49.7, 50, 51.5 A, 252/51.5 R, 56 S, 389 R, 400 R, 37.5

[56] References Cited

U.S. PATENT DOCUMENTS

| | | | |
|---|---|---|---|
| 2,223,411 | 12/1940 | Fuller et al. | 252/50 X |
| 2,813,076 | 1/1957 | Edelman et al. | 252/33.6 X |
| 2,977,308 | 3/1961 | Müller et al. | 252/50 |
| 3,412,028 | 11/1968 | Godfrey | 252/49.7 X |
| 3,413,223 | 11/1968 | Forbes et al. | 252/49.7 X |
| 3,422,014 | 1/1969 | Forbes et al. | 252/56 S X |
| 3,492,233 | 1/1970 | Hepplewhite et al. | 252/50 X |
| 3,634,238 | 1/1972 | Bridger | 252/26 |
| 3,681,247 | 8/1972 | Wann | 252/56 S X |
| 3,763,244 | 10/1973 | Suubkin | 252/56 S X |
| 3,914,179 | 10/1975 | Byford et al. | 252/56 S X |

FOREIGN PATENT DOCUMENTS

| | | | |
|---|---|---|---|
| 564615 | 10/1958 | Canada | 252/49.7 |
| 492536 | 11/1975 | U.S.S.R. | 252/49.7 |

*Primary Examiner*—Andrew Metz
*Attorney, Agent, or Firm*—Anthony Lagani, Jr.

[57] ABSTRACT

Lubricating oils are stabilized against oxidative degradation by the use of a stabilizer comprising (A) an amine wherein the amine is a substituted benzylamine, or a substituted 1-amino-1,2,3,4-tetrahydronaphthalene, (B) a metal deacturator and (C) a metal or metal salt. Optionally a metal deactivator can be incorporated into the system. The preferred substitute benzylamine is N(alpha-methyl benzyl)amine the preferred naphthalamine is phenyl-alpha-naphthalamine.

16 Claims, No Drawings

METHOD OF STABILIZING LUBRICATING FLUIDS

This is a continuation, of application Ser. No. 043,995, filed May 31, 1979 and now abandoned.

BACKGROUND OF THE INVENTION

Advanced automotive, aircraft and other industrial equipment require lubricating oils that are effective at elevated temperatures. Polyesters, polyolefins, polyglycols, polyphenyl ethers, phosphates, silicones, etc. have been used as suitable lubricating oils. These lubricating oils undergo oxidative degradation at elevated temperatures. Loss of lubricating properties due to oxidative breakdown of these oils may cause failure of a part, or parts, in contact with the oils. The prior art discloses the stabilization of lubricating oils using various amines including diphenyl- and substituted diphenylamines, p-phenylenediamine and substituted naphthylamine. There appears to be no recognition of the use of secondary amines wherein one of the groups attached the amino nitrogen is an aromatic or substituted aromatic ring and the other group is an aliphatic carbon which in turn is attached to an aromatic or substituted aromatic ring.

U.S. Pat. No. 1,469,245 discloses N-(o-Hydroxybenzyl)-N'-phenyl-p-phenylene diamine as an anti-degradant for rubber. This compound belongs to the class of phenylene diamines which are known antioxidants. Furthermore, its use as a stabilizer for lubricating oils is neither disclosed in that patent, nor elsewhere.

U.S. Pat. No. 2,108,147 teaches a method for preparing secondary and teritary amines including 1-anilino-1-phenylethane. Hickenbottom teaches a phenylamine compound designated as alpha-phenylethyl-p-toluidine; see *Journal of the Chemical Society* (1934) pages 319–322. Beilstein discloses a phenyl amine compound of the general formula

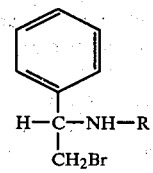

wherein R can be phenyl; see *Handbuch Der Organishen Chemie* 4th Ed. Vol XII Pat. IV pages 2403–4. None of the aforegoing compounds are taught to be antioxidants.

SUMMARY OF THE INVENTION

It has surprisingly been found that certain amino compounds are effective as antioxidants. These amino compounds have the general formula

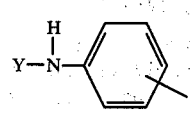

wherein Y is:

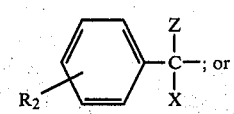

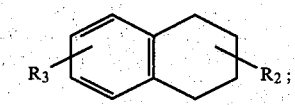

When Y is the moiety of formula (II), Z is H or $C_1$ to $C_3$ alkyl; and X and $R_2$ are each independently selected from the group consisting of hydrogen, $C_1$–$C_{12}$ alkyl, $C_1$–$C_{12}$ alkoxy; $C_2$–$C_{18}$ carbalkoxy, halogen, or nitro and $R_1$ is hydrogen, $C_1$–$C_{12}$ alkyl, $C_1$–$C_{12}$ alkoxy, $C_2$–$C_{18}$ carbalkoxy, halogen, amino or nitro. When Y is the moiety of formula (III), $R_1$ and $R_3$ are each independently selected from the group of moieties set forth as $R_1$ above and $R_2$ is as previously defined.

The compounds of this invention are novel compounds when X and Z are each independently selected from the group H and $C_1$–$C_3$ alkyl; and $R_1$ and $R_2$ are as previously defined.

In its preferred embodiment the antioxidants of this invention are used in conjunction with a metal deactivator and a metal or metal salt. The preferred metal salts are oil soluble organic salts, e.g., metal naphthenates.

DETAILED DESCRIPTION OF THE INVENTION

This invention relates to a method of stabilizing lubricating oils against oxidation and sludge formation. In particular this invention relates to a method for stabilizing such oils utilizing phenylated benzylamines or phenylated tetrahydro naphthylamines, which may be substituted or unsubstituted, either alone or in conjunction with a metal deactivator and a metal compound. This stabilizer system provides a surprisingly high degree of resistance to oxidative breakdown of lubricating oils as well as resulting in dramatic reductions in sludge formation. Certain of the phenylated benzylamines and phenylated tetrahydro naphthylamines used in the practice of this invention are novel compounds.

The method of this invention for stabilizing a lubricating oil comprises utilizing as the stabilizer amino compounds having the general formula

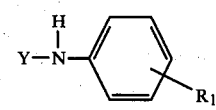

wherein Y is:

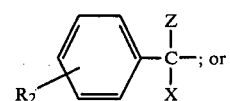

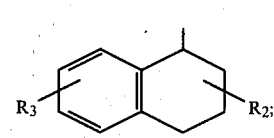

When Y is the moiety of formula (II), Z and X are each independently selected from the group consisting of H or $C_1$ to $C_3$ alkyl; $R_2$ selected from the group consisting of hydrogen, $C_{-1}$ to $C_{12}$ alkyl, $C_1$–$C_{12}$ alkoxy; $C_2$–$C_{18}$ carbalkoxy, halogen, or nitro and $R_1$ is hydrogen, $C_1$–$C_{12}$ alkyl, $C_1$–$C_{12}$ alkoxy, $C_2$–$C_{18}$ carbalkoxy, halogen, amino or nitro. When Y is the moiety of formula (III), $R_1$ and $R_3$ are each independently selected from the group of moieties set forth as $R_1$ above and $R_2$ is as previously defined.

The comounds of this invention are novel compounds when X and Z are each independently selected from the group consisting of H and $C_1$–$C_3$ alkyl; and $R_1$ and $R_2$ are as previously defined. In its preferred embodiment Z is H or methyl and X is methyl.

Illustrative non-limiting examples of the antioxidants of this invention are
N-(alpha-methyl-p-octyl benzyl)aniline;
N-(alpha-methyl-p-nonyl benzyl)aniline;
N-(alpha-methyl benzyl)-p-nonylaniline;
N-(alpha-methyl benzyl)-p-dodecylaniline;
N-(alpha-methyl benzyl)-p-methoxyaniline;
N-(alpha-methyl benzyl)-m-methoxyaniline;
N-(alpha-methyl benzyl)-o-methoxyaniline;
N-(alpha-methyl benzyl)-m-carbethoxyaniline;
N-(alpha-methyl benzyl)-o-carbethoxyaniline;
N-(alpha-methyl benzyl)-p-chloroaniline;
N-(alpha-methyl benzyl)-m-chloroaniline;
N-(alpha-methyl benzyl)-o-chloroaniline;
N-(alpha,alpha-dimethylbenzyl)aniline
1-(p-dodecylanilino)-1,2,3,4-tetrahydronaphthalene;
1-(p-carbethoxyanilino)-1,2,3,4-tetrahydronaphthalene;
N-(p-acetyl-alpha-methyl benzyl)aniline; and
1,4-bis-(1-anilinoethyl)benzene.

The preferred antioxidants of this invention are
N-(alpha-methyl-p-octylbenzyl)aniline and
N-(alpha-methyl benzyl)-p-nonylaniline.

Addition of the amines described above to lubricating oils imparts an unexpectedly high degree of resistance to oxidative breakdown.

The amines of this invention are useful in stabilizing a wide range of lubricating oils including polyester oils, mineral oils and synthetic hydrocarbon oils. The stabilizer system of this invention is particularly effective for use in polyolester lubricating oils.

The polyolester lubricating oils for which the stabilizer systems of this invention are suitable are synthetic lubricants based upon one or more organic carboxylic acid esters. Illustrative examples of such oils are diesters such as dioctyl sebacate or dinonyl adipate prepared by the reaction of a dibasic acid and a monohydric alcohol; triesters such as trimethylolpropane tripelorgonate or trimethylolpropane tricaprilate prepared by the reaction of trimethylol propane and a monobasic acid; tetraesters such as pentaerythritol tetracaprilate prepared by the reaction of pentaerythritol and a monobasic acid; esters of trimethylolpropane or pentaerythritol prepared by reaction with mixtures of monobasic acids; or complex esters prepared by reacting mixtures of monobasic acids, dibasic acids and polyhydric alcohols.

The synthetic hydrocarbon oils to which the stabilizer system of this system of this invention may be added are oligomers of alpha olefins. The preferred alpha olefins are $C_3$–$C_{14}$ alphaolefins. Normally, these hydrocarbon oils have a number average molecular weight of about 280 to about 2,000; preferably about 350 to about 1,500. These lubricating oils have low unsaturation preferably having an iodine number of less than 3.

The term "antioxidant" when used in the specification and claims means the substituted phenylated amines and substituted tetrahydronaphthylamines of this invention. The term "stabilizer system" as used in the specification and claims means the aforegoing antioxidants in conjunction with a metal compound and a metal deactivator.

The metal may be present either as the free metal or a salt of a metal. The salt must be soluble in the lubricating oil and is preferably an organometallic salt.

The preferred salts include naphthenates, stearates, acetylacetonates, octoates, decanoates etc.

The metal deactivators useful in the practice of this invention are benzotriazole and benzotriazole derivatives. The benzotriazole derivative can be alkyl substituted or dialkyl amino alkyl substituted; preferably dialkyl amino alkyl substituted. Substitution is on the secondary nitrogen of the triangle. The alkyl group can be a $C_1$ to $C_{20}$ alkyl and each alkyl may be the same or different than the others. Preferably the alkyl groups are selected to give the benzotriazole derivative sufficient oil solubility to be incorporated into the lubricant in an effective amount e.g. $C_6$–$C_{12}$ alkyl. Typical of such compounds is Reomet 38 marketed by Ciba Geigy Co. The term "metal deactivator" as used in the specification and claims means a compound which when added to a lubricant will neutralize the catalytic effect of metals e.g. copper in promoting oxidation.

The various components of the antioxidant system which may be added in any order are used in the following amounts. The antioxidant of this invention is used in amounts varying from about 0.5 to about 5.0 parts by weight per 100 parts of the oil, preferably, about 1.0 to about 4.0 parts; more preferably 2.0 to 2.5 parts. The metal deactivators can be used in amounts of about 0.05 to about 1.0 part by weight per 100 parts of the oil, preferably, 0.1 to 0.3 part. Metal or metal salts are used in the amounts of about 1 to about 25 parts of metal by weight per million parts of the oil; preferably 2 to 10 parts. The preferred metal is copper.

The criteria used herein to evaluate the effectiveness of an antioxidant for lubricating oils are:
(1) the amount of sludge produced,
(2) the change in initial viscosity,
(3) the change in neutralization number; and,
(4) the weight change of the test metals.

These criteria are determined after the oil containing the antioxidant system of this invention has been aged for 72 hours at 370° F. or after the oil containing the antioxidant system has been aged for 48 hours at 425° F.

The benefits of the antioxidants and stabilizers of this invention may be more readily appreciated by reference to the following examples. The term "polyester" as used in the specification and claims means a polyester prepared from a polyol by reacting the polyol with a stochiometric equivalent of mono basic acids.

EXAMPLE 1

This example shows the unexpected ability of the antioxidant of the present invention to protect polyester based lubricating oils against oxidative degradation. The oil used was a commercially available polyolester fluid, Hercolube A (marketed by Hercules Inc.) and believed to be one prepared from pentaerythritol and a mixture of monocarboxylic acids, e.g., valeric acid and pelargonic acid.

Experiments were carried out in order to evaluate the effectiveness of the antioxidant. The oil sample used in runs B and C was prepared by adding N-(alpha-methylbenzyl) aniline in the amount set forth in Table I to 100 grams of the polyester based oil. Sample D was similarly prepared containing phenyl alpha-naphthylamine, a commercially available stabilizer. The amounts used in each case are set forth in Table I.

Each of the samples was tested according to the following test procedures:

A 100 ml. sample having the compositions set forth in Table I is poured into a pyrex glass test cell and aged by inserting one end of a glass air delivery tube into the test cell while the remaining 25 ml. portions of each original oil sample is set aside and analyzed for neutralization number and Kinematic Viscosity in centistokes at 100° F. Around this glass air delivery tube immersed in the oil was placed from zero to four metal washers (Mg, Cu, Ag, and Fe) as identified in Table I. When more than one washer was used, they were separated from each other by glass spacers. These remained in the oil during the aging process and served to indicate the extent of corrosion of the oil oxidative decomposition products on the metal. The test cell was then fitted with a reflux condenser. The assembly was placed in a constant temperature aluminum block. An air hose was then attached to the other end of the air delivery tube and the air flow was adjusted so that five liters of air per hour was bubbled through the oil. This aging test was carried out for 48 hours at 125° F. After aging, the oil was filtered hot and the amount of sludge developed was collected and was determined and recorded in milligrams per 100 ml. of the oil. The filtered oil was then analyzed to determine changes in neutralization number and Kinematic Viscosity at 100° F.

The neutralization number was determined by the color-indicator titration method according to ASTM Procedure D974-55T.

The Kinematic Viscosity was determined according to ASTM Procedure D445-53T.

The metal washers, which were weighed initially, were then carefully washed and weighed again to determine the weight change in grams.

The data in Table I dramatically show that when an amine such as N-(alpha-methylbenzyl) aniline is added to a polyolester based lubricating oil the aged properties of oil Samples B and C are excellent as noted by very little change in the viscosity or neutralization number, very low sludge and essentially no weight change in the metals. The amine antioxidant of the present invention clearly provides better all around protection than a commercially available stabilizer (Sample D).

It should be noted that Sample C, wherein the test was conducted in the presence of copper, was slightly more deteriorated than Sample B, where no copper was present.

TABLE I

| RUN# | OIL[1] | STABILIZER SYSTEM | GRAMS OF STABILIZER | % $V_{100}$[2] | N.N.[3] | SLUDGE (in mg.) | OIL[1] | WEIGHT CHANGE (in grams) OF WASHERS | | | |
|------|--------|-------------------|---------------------|------|------|-----------------|--------|--------|--------|--------|--------|
| | | | | | | | | Mg | Fe | Cu | Ag |
| A | 100 | — | — | 94.9[4] | 26.2 | Undetermined | 100 | −0.1366 | −0.0052 | −0.0091 | −0.0001 |
| B | 100 | 5 | 2.0 | 13.68 | 2.7 | 5.1 | 100 | −0.0001 | +0.0003 | * | −0.0017 |
| C | 100 | 5 | 2.0 | 18.81 | 2.64 | 19.7 | 100 | +0.0001 | −0.0004 | −0.0011 | −0.0001 |
| D | 100 | 6 | 2.0 | 31.5 | 2.2 | 135.7 | 100 | −0.0130 | 0.0000 | −0.0024 | −0.0001 |

*no metal included
LEGEND:
[1]Oil---Commercially available, Hercolube A.
[2]%/$V_{100}$---Percent change in viscosity at 100° F.
[3]N.N.---Neutralization Number of aged oil.
[4]Aged oil was so viscous that it could not be completely filtered to determine the amount of sludge formed. Neutralization number and viscosity of the aged oil are actually the properties of a small sample that could be filtered.
[5]N-(alpha-methylbenzyl)aniline
[6]Phenyl-alpha-naphthylamine

EXAMPLE II

This example demonstrates the effect of the addition of and changes in the levels of a metal deactivator such as Recomet-38, a benzotriazole derivative marketed by Ciba Geigy Co., on the stabilization of a polyolester based lubricating oil while the level of N-(alpha-methylbenzyl)aniline and copper are maintained constant. The samples were prepared as in EXAMPLE I.

The data in Table II shows that the addition of Reomet-38 at the levels tested is effective in controlling viscosity change, neutralization number change and sludge formation. The data further demonstrates that the addition of Reomet-38 dramatically controls the weight loss of the copper washer.

The data in Table II also shows that the addition of even low levels of the metal deactivator (samples B and C) provide better protection than when no deactivator is used (sample A).

TABLE II

| SAMPLE[1] | ANTIOXIDANT[2] (grams) | R-38[3] (grams) | % $V_{100}$ | N.N. | SLUDGE (mg) | WEIGHT CHANGE (in grams) OF WASHERS | | | |
|-----------|------------------------|-----------------|-------|------|-------------|--------|--------|--------|--------|
| | | | | | | Mg | Fe | Cu | Ag |
| A | 2.0 | 0.00 | 18.81 | 2.64 | 19.7 | +0.0001 | +0.0004 | −0.0011 | +0.0001 |
| B | 2.0 | 0.07 | 12.04 | 1.65 | 5.2 | +0.0001 | 0.0000 | −0.0004 | 0.0000 |
| C | 2.0 | 0.08 | 6.99 | 1.66 | 6.5 | 0.0000 | 0.0000 | −0.0003 | −0.0004 |
| D | 2.0 | 0.30 | 7.61 | 1.60 | 6.7 | 0.0000 | +0.0003 | −0.0001 | −0.0002 |

TABLE II-continued

| SAMPLE[1] | ANTIOXIDANT[2] (grams) | R-38[3] (grams) | % V$_{100}$ | N.N. | SLUDGE (mg) | WEIGHT CHANGE (in grams) OF WASHERS | | | |
|---|---|---|---|---|---|---|---|---|---|
| | | | | | | Mg | Fe | Cu | Ag |
| E | 2.0 | 0.50 | 18.42 | 4.20 | 9.2 | 0.0001 | +0.0002 | +0.0003 | +0.0004 |

NOTES:
[1]100 ml. of Hercolube A is used.
[2]Antioxidant N-(alpha-methylbenzyl)aniline
[3]R-38: Reomet-38 is used as metal deactivator (a commercially available material from Ciba-Geigy Chemical Co.)

EXAMPLE III

This example dramatically demonstrates that Reomet-38 cannot be included in the stabilizing system without incorporating copper either in the form of a soluble salt or in the form of a metal strip, washer, wire, etc. This example further shows how changes in the level of copper while maintaining constant N-(alpha-methylbenzyl) aniline and Reomet-38 levels effects stabilization. The samples were prepared as in EXAMPLE I.

The data in Table III shows that a stabilizer system containing N-(alpha-methylbenzyl)aniline and Reomet-38 is ineffective in the absence of copper (Sample A, Table III) in decreasing the amounts of sludge, maintaining low viscosity, low neutralization number, and protecting the metal washers from oxidation. In the absence of copper, Reomet 38 functions as a pro-degradant. The data in Table III further shows that increasing amounts of copper above 10 ppm causes the stabilizer system to exhibit a decrease in its efficiency in controlling oxidative breakdown.

Clearly Sample II-D illustrates that when the amine, a metal deactivator and copper are present, the greatest protection is afforded to the oil. Sample I-B (amine but no copper), Sample I-C (amine and copper) and most dramatically Sample III-A (amine and metal deactivator but no copper) all show decreased protection when compared with II-D where all three components of the instant invention are present in the system.

TABLE IV

| SAMPLE[1] | ANTIOXIDANT[2] (grams) | R-38[3] (grams) | % V$_{100}$ | N.N. | SLUDGE (mg) | WEIGHT CHANGE (in grams) OF WASHERS | | | |
|---|---|---|---|---|---|---|---|---|---|
| | | | | | | Mg | Fe | Cu | Ag |
| A (Table I) | — | — | 94.9** | 26.2 | * | −0.1366 | −0.0052 | −0.0091 | −0.0001 |
| B (Table I) | 2.0 | — | 13.68 | 2.7 | 5.1 | −0.0001 | +0.0003 | * | −0.0017 |
| C (Table I) | 2.0 | — | 18.81 | 2.64 | 19.7 | +0.0001 | +0.0004 | +0.0011 | +0.0001 |
| D (Table II) | 2.0 | 0.3 | 7.61 | 1.6 | 6.7 | 0.0000 | +0.0003 | −0.0001 | −0.0002 |
| A (Table III) | 2.0 | 0.3 | 32.05 | 5.6 | 560.7 | −0.0594 | +0.0007 | * | −0.0001 |

NOTES:
[1]100 ml. of Hercolube A is used.
[2]Antioxidant N-(alpha-methylbenzyl)aniline.
[3]R-38: Reomet-38 is used as metal deactivator (a commercially available material from Ciba-Geigy Chemical Co.)
*No metal included
**Aged oil was so viscous that it could not be completely filtered to determine the amount of sludge formed. Neutralization number and viscosity of the aged oil is actually the properties of a small sample that could be filtered.

EXAMPLE V

This example demonstrates how the stabilization of a polyolester based lubricating oil is affected by changes in the level of N-(alpha-methylbenzyl)aniline while maintaining constant Reomet-38 level in the presence of a constant amount of copper metal. The samples were prepared as in EXAMPLE I, using the amounts of ingredients as shown in Table V.

The data in Table V show that when a level of about 2.0 to 3.0 parts of N-(alpha-methylbenzyl)aniline was used together with 0.2 part of Reomet-38, a polyolester based lubricating oil is effectively stabilized. The preferred level of N-(alpha-methylbenzyl) aniline is shown

TABLE III

| SAMPLE[1] | Antioxidant[2] (grams) | R-38[3] (grams) | CU[4] | % V$_{100}$ | N.N. | SLUDGE (mg) | WEIGHT CHANGE (in grams) OF WASHERS | | | |
|---|---|---|---|---|---|---|---|---|---|---|
| | | | | | | | Mg | Fe | Cu | Ag |
| A | 2.0 | 0.1 | — | 12.05 | 5.6 | 560.7 | −0.0594 | +0.0007 | | −0.0001 |
| B | 2.0 | 0.2 | Washer | 15.66 | 1.58 | 5.7 | +0.0001 | +0.0001 | −0.0001 | −0.0001 |
| C | 2.0 | 0.2 | 1ppm | 12.64 | 0.51 | 19.3 | +0.0003 | +0.0001 | | +0.0001 |
| D | 2.0 | 0.2 | 10ppm | 9.14 | 1.6 | 40.9 | +0.0003 | +0.0001 | | −0.0001 |
| E | 2.0 | 0.2 | 30ppm | 22.15 | 1.7 | 98.5 | −0.0002 | +0.0002 | | −0.0001 |
| F | 2.0 | 0.3 | Washer | 7.61 | 1.6 | 6.7 | 0.0000 | +0.0003 | −0.0001 | −0.0002 |
| G | 2.0 | 0.3 | 30ppm | 15.33 | 1.59 | 173.3 | −0.0116 | +0.0001 | −0.0003 | −.0002 |
| H | 2.0 | 0.3 | 200pm | 20.8 | 7.61 | 582.2 | +0.0373 | +0.0001 | −0.0015 | −0.0003 |

NOTES:
[1]100 ml. of Hercolube A is used.
[2]Antioxidant N-(alpha-methylbenzyl)aniline.
[3]R-38: Reomet-38 is used as metal deactivator.
[4]Cu: Copper is added as copper naphthenate.

EXAMPLE IV

This example utilizes data presented in Examples I, II and III to be from 2.0 to 2.5 parts.

It can be seen from the results of Table V that the level of the N-(alpha-methylbenzyl)aniline is critical in producing polyolester based lubricating oils having outstanding aged physical properties while maintaining Reomet-38 at a constant level.

was purified by either crystallization or by vacuum distillation.

TABLE V

| SAMPLE | OIL[1] | ANTIOXIDANT[2] (grams) | R-38[3] (grams) | % V$_{100}$ | N.N. | SLUDGE (mg) | OIL | WEIGHT CHANGE (in grams) OF WASHERS | | | |
|---|---|---|---|---|---|---|---|---|---|---|---|
| | | | | | | | | Mg | Fe | Cu | Ag |
| A | 100 | 1.5 | 0.2 | 23.91 | 5.4 | 694.8 | 100 | −0.0521 | +0.0002 | +0.0002 | +0.0001 |
| B | 100 | 2.0 | 0.2 | 17.13 | 1.4 | 10.9 | 100 | 0.0000 | 0.0000 | +0.0001 | −0.0001 |
| C | 100 | 2.2 | 0.2 | 14.03 | 1.1 | 9.5 | 100 | −0.0001 | 0.0000 | +0.0002 | +0.0001 |
| D | 100 | 2.5 | 0.2 | 18.62 | 1.1 | 10.0 | 100 | +0.0001 | +0.0002 | +0.0002 | 0.0000 |
| E | 100 | 3.0 | 0.2 | 9.64 | 1.1 | 30.9 | 100 | −0.0026 | +0.0002 | +0.0001 | +0.0002 |

NOTES:
[1]Oil - Commercially available, polyolester based lubricating oil, Hercolube A.
[2]N-(alpha-methylbenzyl)aniline.

EXAMPLE VI

This example demonstrates how various substituted N-benzylanilines effect the stabilization of a polyolester based oil while maintaining a constant Reomet-38 level in the presence of a constant amount of copper metal.

Substituted N-benzylanilines were prepared by catalytic hydrogenation of the corresponding Schiff's bases. Five percent Pd/c was used as the catalyst and ethanol was used as the solvent for hydrogenating the Schiff's bases. Schiff's bases, in turn, were prepared by the reaction of the appropriate ketones and anilines in the presence of molecular seives. About 40 grams of molecular sieves (Linde 5A) were added to 1.0 mole of ketone and 1.0 to 1.2 moles of aromatic amine in 200 ml. of benzene; see Kazuo Taguchi and F. H. Westheimer, J. ORG. CHEM. 36, 1570 (1971). The reaction mixture was refluxed with continuous removal of water until almost no free ketone could be detected in the reaction mixture by I. R. spectroscopy. The mixture was then filtered and the molecular seives washed with benzene. The filtrate and washings were combined and evaporated to dryness under reduced pressure. The crude product The samples were prepared and tested as in EXAMPLE I using the amounts of ingredients as shown in Table VI.

The data in Table VI clearly show that substituted benzylanilines of this invention stabilize polyolester based lubricating oils with respect to oxidative breakdown.

Substitution on the aromatic ring of the benzyl group seems to have little adverse effect.

TABLE VI
EFFECT OF SUBSTITUENTS IN N-BENZYLANILINES

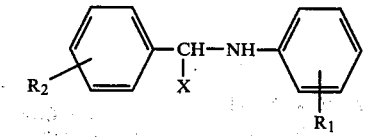

| Run No. | R$_2$ | R$_1$ | X | R-38 (grams) | Aged N.N. | % V$_{100}$ | Sludge mg/100ml | WEIGHT CHANGE (in grams) OF WASHERS | | | | Remarks |
|---|---|---|---|---|---|---|---|---|---|---|---|---|
| | | | | | | | | Mg | Fe | Cu | Ag | |
| 1 | H | p-COOC$_2$H$_5$ | CH$_3$ | 0.2 | 1.6 | 37.96 | 1,096.4 | −0.0634 | −0.0002 | −0.0018 | 0.0000 | B |
| 2 | H | m-COOC$_2$H$_5$ | CH$_3$ | 0.2 | 6.03 | 40.17 | 1,625.0 | −0.0683 | −0.0002 | −0.0014 | −0.0003 | B |
| 3 | H | p-OCH$_3$ | CH$_3$ | 0.2 | 5.4 | 32.22 | 1,294.1 | −0.0523 | 0.0000 | −0.0001 | 0.0000 | B |
| 4 | H | m-OCH$_3$ | CH$_3$ | 0.2 | 2.2 | 41.84 | 25.2 | −0.0455 | 0.0000 | −0.0036 | −0.0002 | B |
| 5 | H | o-OCH$_3$ | CH$_3$ | 0.2 | 7.5 | 39.09 | 146.2 | −0.0500 | +0.0010 | −0.0036 | −0.0002 | B |
| 6 | H | p-C$_{12}$H$_{25}$ | CH$_3$ | 0.2 | 10.0 | 370.61 | 32.0 | −0.0877 | +0.0001 | −0.0002 | 0.0000 | C |
| 7 | H | p-Cl | CH$_3$ | 0.2 | 4.3 | 33.49 | 33.1 | −0.0419 | +0.0001 | −0.0048 | −0.0051 | B |
| 8 | H | m-Cl | CH$_3$ | 0.2 | 7.7 | 25.81 | 568.3 | −0.0203 | 0.0000 | −0.0040 | −0.0008 | B |
| 9 | H | o-Cl | CH$_3$ | 0.2 | 9.8 | 29.30 | 606.9 | −0.0163 | −0.0012 | −0.0077 | −0.0017 | B |
| 10 | p-CH$_3$ | H | CH$_3$ | 0.2 | 1.1 | 11.24 | 6.6 | −0.0001 | −0.0030 | −0.0002 | −0.0001 | B |
| 11 | p-CH$_3$ | H | CH$_3$ | 0.2 | 3.7 | 29.50 | 13.9 | −0.0001 | −0.0004 | −0.0002 | −0.0004 | B |
| 12 | H | H | CH$_3$ | 0.2 | 1.0 | 17.13 | 6.9 | −0.0001 | −0.0002 | −0.0001 | −0.0001 | B |
| 13 | H | H | CH$_2$CH$_2$CH$_3$ | 0.2 | 7.3 | 25.31 | 606.0 | −0.0620 | −0.0002 | −0.0002 | −0.0001 | B |
| 14 | | | | | 26.2 | 94.97 | COULD NOT BE FILTERED | −0.1366 | −0.0052 | −0.0091 | −0.0001 | A |
| 15 | H | p-COOC$_{12}$H$_{25}$ | CH$_3$ | 0.2 | 2.7 | 36.11 | 2.8 | 0.0000 | −0.0001 | −0.0007 | −0.0002 | D |

NOTES:
A. No antioxidant is used. In other experiments, with the exception of Run 14, 2.0 g of substituted N-benzylaniline is used.
B. Hercolube A (100 ml) is used for each test.
C. Hercolube A (50 ml) is used for this test.
D. 3.5 g of the antioxidant is used.

EXAMPLE VII

A preferred embodiment of this invention involves alkylation in the benzyl ring and/or the aniline ring of the parent alpha-methyl benzyl aniline. This is beneficial in that it results in decreased volatility of the parent compound. Thus, such compounds as

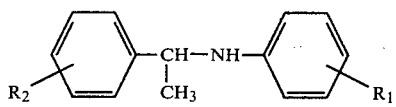

where $R_2$ can be H, or a $C_1$ to $C_{12}$ alkyl group and $R_1$ can be H or a $C_4$ to $C_{12}$ alkyl group; provided that $R_1$ and $R_2$ are not simultaneously both hydrogen. $R_2$ can be a $C_1$ to $C_{12}$ alkyl group which may or may not be branched. $R_1$ can be an alkyl group, preferably in the para-position or a tertiary alkyl group such as those derived from isobutylene, isobutylene dimer, isobutylene trimer, propylene trimer, alpha-methyl styrene and the like.

EXAMPLE IX

To 100 parts of polydecene synthetic hydrocarbon oil is added 2.0 parts of 1-(p-dodecylanilino)-1,2,3,4-tetrahydronaphthalene and 0.5 part Reomet 38. Oxidative testing of the oil as described in Example II-E show that the above combination effectively protects synthetic hydrocarbon oils against oxidative breakdown.

EXAMPLE X

To 100 parts of mineral oil is added 2.0 parts of N-(alphamethylbenzyl)-aniline and 0.5 parts Reomet 38 as in Example II.E. The resulting blend is found also to exhibit excellent antioxidant properties when an aging test is performed at elevated temperatures.

TABLE VII

| SAMPLE[1] | ANTIOXIDANT[2] (grams) | R-38[3] (grams) | %/ $V_{100}$ | N.N. | SLUDGE (mg) | WEIGHT CHANGE (in grams) OF WASHERS | | | |
|---|---|---|---|---|---|---|---|---|---|
| | | | | | | Mg | Fe | Cu | Ag |
| A | 2.5 | 0.2 | 20.8 | 3.5 | 16.7 | +0.0001 | +0.0002 | −0.0006 | 0.0000 |
| B | 3.0 | 0.2 | 25.2 | 2.6 | 13.9 | +0.0001 | +0.0002 | −0.0004 | −0.0001 |
| C | 3.5 | 0.2 | 16.4 | 1.5 | 5.7 | 0.0000 | +0.0002 | 0.0000 | 0.0000 |

[1]100 ml. of Hercolube A is used.
[2]Antioxidant N-(alpha-methyl-p-octyl) benzylaniline.
[3]R-38: Reomet-38 is used as metal deactivator.

EXAMPLE VIII

This example shows how phenylated- alpha-tetralylamine affects the stabilization of a polyolester based lubricating oil.

The phenylated- alpha-tetralylamines were prepared according to the procedure described in EXAMPLE VI.

The samples were prepared as in Example I using the amounts of ingredients as shown in Table VIII.

The data in Table VIII shows that the addition of phenylated- alpha-tetralylamine, a metal deactivator and copper or a copper salt to a polyolester lubricating oil such as Hercolube A stabilizes the said oil against oxidative breakdown.

EXAMPLE XI

To 100 parts of polyoctene synthetic hydrocarbon oil is added 2.0 parts of N-(alpha-methylbenzyl)aniline and 0.5 parts Reomet 38 as in Example II.E. The resulting blend is found to exhibit excellent antioxidant properties when an aging test is performed at elevated temperatures.

EXAMPLE XII

To 100 parts of polydecene synthetic hydrocarbon oil is added 2.0 parts of N-(alpha-methylbenzyl)aniline and 0.5 parts Reomet 38 as in Example II.E. The resulting blend exhibits excellent antioxidant properties when aging is performed at elevated temperatures.

TABLE VIII

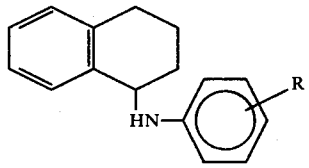

| Run No. | R | R-38 (grams) | A.O. (grams) | OIL | CHANGE in N.N. | % $V_{100}$ | SLUDGE (in mg) | WEIGHT CHANGE (in grams) OF WASHERS | | | |
|---|---|---|---|---|---|---|---|---|---|---|---|
| | | | | | | | | Mg | Fe | Cu | Ag |
| 1 | H | 0.2 | 2.5 | 100 | 5.3 | 24.51 | 34.3 | 0.0000 | +0.0001 | +0.0002 | +0.0001 |
| 2 | H | 0.5 | 2.0 | 100 | 3.7 | 32.31 | 49.7 | +0.0003 | +0.0004 | +0.0003 | +0.0001 |
| 3 | H | 0.2 | 2.0 | 100 | 3.7 | 27.70 | 29.6 | +0.0003 | +0.0004 | +0.0004 | +0.0002 |
| 4 | H | 0.5 | 1.5 | 100 | 12.1 | 40.38 | 36.6 | +0.0002 | +0.0006 | +0.0001 | +0.0002 |
| 5 | H | 0.5 | 1.0 | 100 | 10.4 | 39.57 | 38.9 | +0.0002 | +0.0005 | 0.0000 | +0.0002 |
| 6 | H | 0.5 | 3.0 | 100 | 3.2 | 33.23 | 275.9 | +0.0008 | +0.0012 | +0.0030 | +0.0005 |
| 7 | p-$C_{12}H_{25}$ | 0.5 | 1.0 | 100 | 6.2 | 65.50 | 1,964.2 | −0.9870 | +0.0002 | +0.0001 | +0.0002 |
| 8 | p-$C_{12}H_{25}$ | 0.5 | 2.0 | 100 | 8.4 | 44.88 | 21.9 | +0.0002 | +0.0002 | +0.0002 | −0.0003 |
| 9 | p-$C_{12}H_{25}$ | 0.5 | 3.5 | 100 | 5.4 | 30.06 | 14.9 | +0.0003 | +0.0003 | +0.0006 | +0.0004 |
| 10 | p-$OCH_3$ | 0.5 | 0.9 | 100 | 13.0 | 29.75 | 5,504.2 | −0.0017 | −0.0017 | −0.0002 | +0.0004 |
| 11 | p-$COOC_2H_5$ | 0.5 | 2.0 | 100 | 4.4 | 28.42 | 7.0 | +0.0001 | +0.0001 | +0.0001 | +0.0001 |
| 12 | — | 0 | 0 | 100 | 16.7 | 39.57 | * | −0.1000 | −0.0020 | −0.0495 | −0.0001 |

NOTE:
*Too viscous to filter. N.N. and viscosity were taken on a few milliliters.

EXAMPLE XIII

To 100 parts of a blend of 25 parts polyoctene and 75 parts trimethylol propane triheptanoate synthetic ester fluid is added 2.0 parts of N-(alpha-methylbenzyl) aniline and 0.5 parts Reomet 38 as in Example II.E. The resulting blend possesses excellent antioxidant properties when aging is performed at elevated temperatures.

EXAMPLE XIV

To 100 parts of a blend of 50 parts of polyoctene and trimethylol propane triheptanoate synthetic ester fluid is added 2.0 parts of N-(alpha-methylbenzyl)aniline and 0.5 parts Reomet 38 as in Example II.E. The resulting blend is found to exhibit excellent antioxidant properties when aging is performed at elevated temperatures.

What is claimed is:

1. A method for stabilizing a lubricating oil which comprises utilizing as a stabilizer system an effective amount of:

(A) An amine compound of the general formula

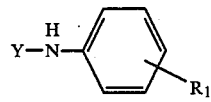
(I)

wherein Y is

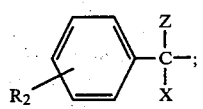
(II)

wherein Z and X are each H or $C_1$–$C_2$ alkyl; provided however that both X and Z are not simultaneously H; $R_1$ is $COOC_2H_5$, $CH_3O$, or p-Cl and $R_2$ is selected from the group consisting of H, $CH_3$, $CH_3O$, octyl and nonyl;

(B) a metal deactivator; and (C) a metal compound wherein the metal compound is a metal or a metal salt, said metal salt being soluble in the lubricating fluid wherein (A) is present in amounts of from about 0.5 to 5.0 parts per 100 parts oil, (B) is present in amounts of about 0.05 to about 1.0 part by weight per 100 parts of oil, and (C) is present in an amount of from 1 to about 25 parts of metal per million parts of oil.

2. The method according to claim 1 wherein the lubricating oil is a polyolester fluid.

3. The method according to claim 1 wherein $R_2$ is hydrogen.

4. The method according to claim 3 wherein $R_1$ is a methoxy group in the ortho, para or meta position.

5. The method according to claim 3 wherein $R_1$ is a $—COOC_2H_5$ radical in the meta or para position.

6. The method according to claim 3 wherein $R_1$ is $—Cl$ in the para position.

7. The method according to claim 1 wherein X is methyl.

8. The method according to claim 1 wherein $R_2$ is p-methyl.

9. The method according to claim 7 wherein $R_2$ is para methoxyl.

10. The method according to claim 1 wherein Z, and $R_2$ are hydrogen and X is $C_1$–$C_2$ alkyl.

11. The method according to claim 1 wherein the lubricating oil is a synthetic hydrocarbon oil.

12. The method according to claim 1 wherein the lubricating oil is a mineral oil.

13. The method according to claim 1 wherein the metal deactivator is a benzotriazole derivative.

14. The method according to claim 1 wherein the metal compound is copper or copper naphthenate.

15. The method according to claim 1 wherein (A) is present in an amount of from about 1.0 to about 4.0 parts per 100 parts of oil, (B) is present in an amount of from 0.1 to 0.3 parts per 100 parts of oil, and (C) is present in an amount of from 2 to 10 parts per million parts of oil.

16. The method according to claim 1 or claim 13, wherein A is present in an amount of from about 2.0 to 2.5 parts per 100 parts of oil, (B) is present in an amount of from 0.1 to 0.3 parts per 100 parts of oil, and (C) is present in an amount of from 2 to 20 parts per million parts of oil.

* * * * *

UNITED STATES PATENT OFFICE
CERTIFICATE OF CORRECTION

PATENT NO. : 4,335,006
DATED : Jun. 15, 1982
INVENTOR(S) : Baldev K. Bandlish et al.

It is certified that error appears in the above–identified patent and that said Letters Patent are hereby corrected as shown below:

Claim 3: after "hydrogen" insert --; X is methyl and Z is H--.

Signed and Sealed this

Fifth Day of October 1982

[SEAL]

Attest:

Attesting Officer

GERALD J. MOSSINGHOFF

Commissioner of Patents and Trademarks